March 24, 1931. E. H. SMITH 1,797,930
SHOCK ABSORBER
Filed Dec. 26, 1925 2 Sheets-Sheet 1
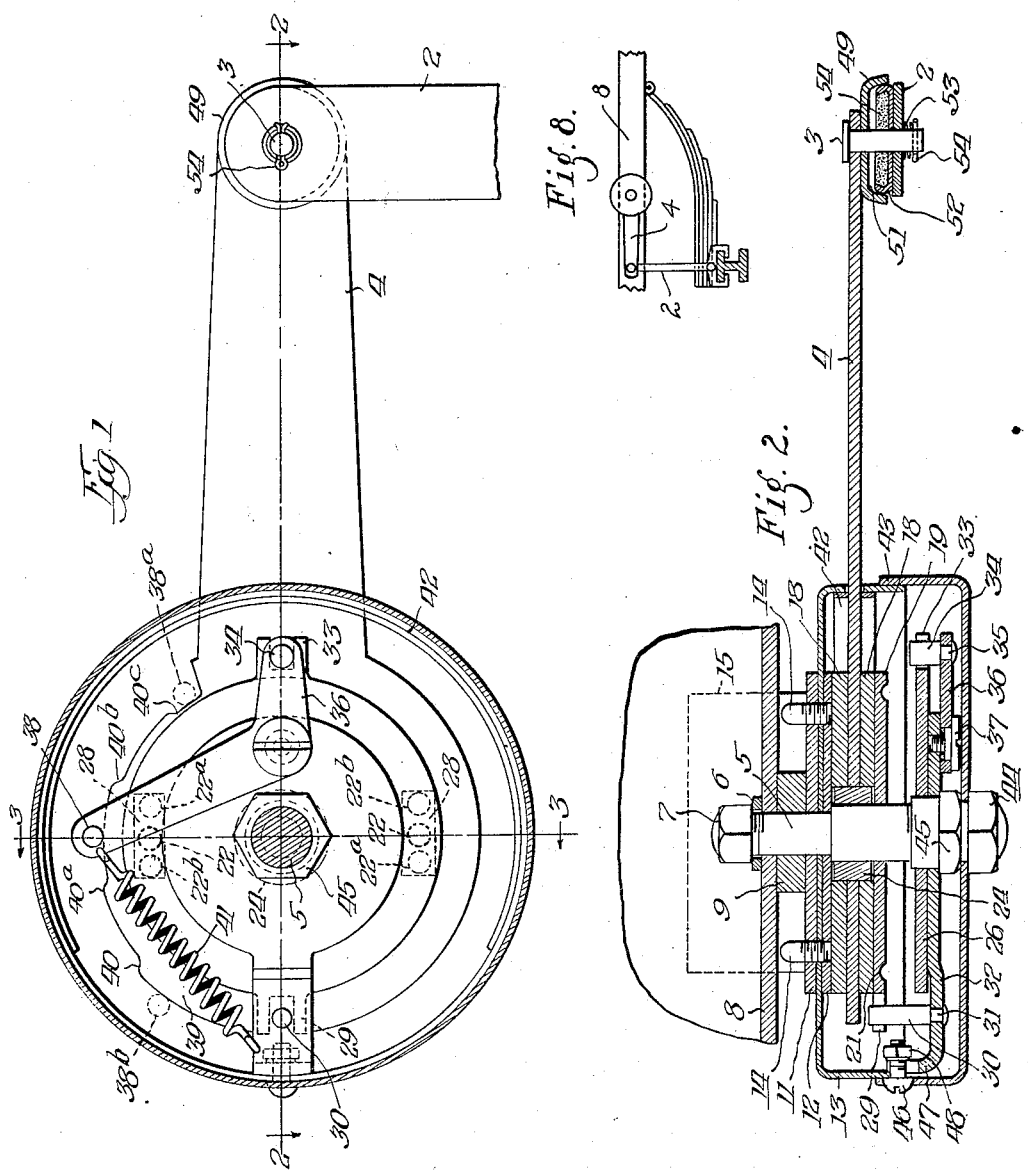

March 24, 1931.  E. H. SMITH  1,797,930
SHOCK ABSORBER
Filed Dec. 26, 1925   2 Sheets-Sheet 2
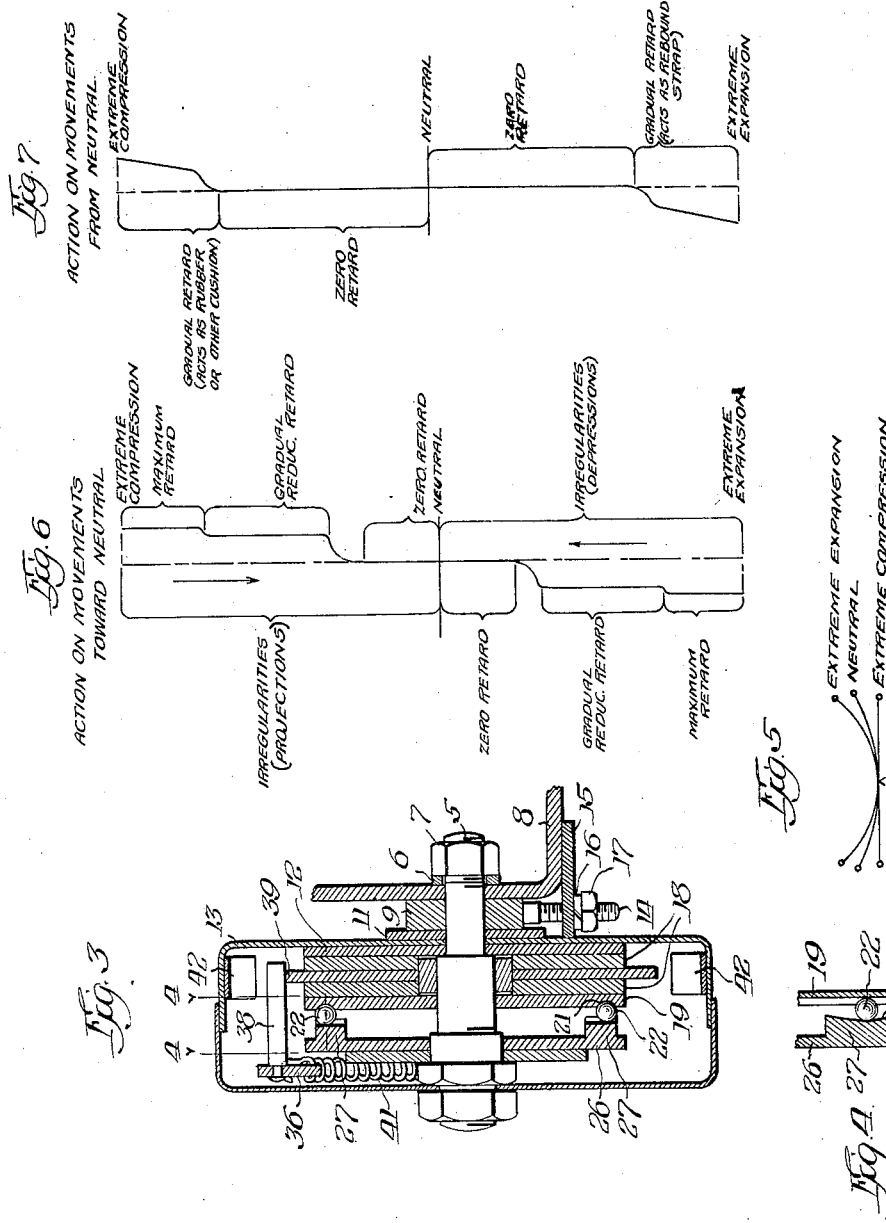

Patented Mar. 24, 1931

1,797,930

UNITED STATES PATENT OFFICE

EARL H. SMITH, OF LANSING, MICHIGAN, ASSIGNOR OF ONE-HALF TO CARL H. JENKINS, OF CHICAGO, ILLINOIS

SHOCK ABSORBER

Application filed December 26, 1925. Serial No. 77,783.

This invention relates to shock absorbers particularly adapted for interposition between a portion of the vehicle body or chassis and an axle or the like of the vehicle, although features and principles involved are of broader application and may be utilized in construction analogous to those of a vehicle wherein two or more relatively movable parts are incorporated.

One of the primary objects of the invention is to provide a shock absorber which will retard or dampen the spring movement from either extreme position, i. e. from a position of extreme compression or a position of extreme expansion, to the neutral position, but which will offer little, if any, resistance to movement of the spring under the influence of the relatively movable parts to which the spring is connected from the neutral position of the spring to either of said extreme positions, except as hereinafter set forth. In other words, my object is to eliminate or reduce to a minimum the violent rebound transmitted to a vehicle when the spring is reacting after passage of the wheel over a raised obstruction or bump in the roadway and the provision of means, which upon the reaction of the extended or expanded vehicle spring occurring at the instant the wheel of the vehicle drops into a depression, will eliminate or reduce to a minimum the tendency of the vehicle body to follow the wheel into the hole and, of course, prevent the corresponding bump or shock which would result.

Another object includes the provision of a shock absorber in which movements of the spring over predetermined distances or under predetermined pressures will be unretarded to or from the neutral position or position of equilibrium in order that a maximum action for the vehicle spring during passage of the vehicle over small bumps or depressions may be had.

Still another object includes the provision of damping or retarding means for vehicle springs which will operate instantaneously when the spring has reached a predetermined position of compression or expansion to gradually reduce or retard further expansive or compressive movements so that the usual rubber bumper or buffer interposed between the spring of the vehicle or between the two relatively movable parts of the vehicle may be eliminated and so that the usual strap connected between the body and the axle of the vehicle for preventing the expansion from carrying the axle and body apart an undesirable distance may also be omitted. In other words, provision is made for a severe retarding effect on movements from the normal or neutral position or position of equilibrium of the spring toward either extreme position, i. e. positions of extreme compression or extreme expansion, only at the end or at a predetermined distance from the end of such movements in order that the shock absorber may act as a cushion between the parts of the vehicle when the vehicle spring is fully compressed and which will serve to function as the usual rebound strap when the vehicle spring is fully extended or in its expanded condition.

A further object is to provide a shock absorber in which a maximum retarding or snubbing effect will become instantaneously effective on movements of the spring or the relatively movable portions of the vehicle from positions of extreme compression or expansion toward the neutral position or position of equilibrium of the spring and the position of rest of the relatively movable portions of the vehicle, respectively, and to provide this maximum retarding action during a predetermined movement of the vehicle portions or of the spring in such direction and to thereafter gradually reduce the retarding action to a zero value upon continued movement of the portions to their position of rest or of the spring to its neutral position or position of equilibrium.

A further object includes the provision of a shock absorber embodying any or all of the foregoing features which may be readily attached to or detached from the vehicle frame by means of a single bolt or other similar securing means.

A still further object includes the provision of bearings for the lever arms of a shock absorber of such nature that the wear normally encountered in the use of a shock absorber of the lever type may be reduced to a minimum and the parts upon the occurrence of any wear will be automatically adjusted or taken up to prevent rattling and wear due to loose joints and further, one which will not only have all the flexibility of a ball joint, but will be provided with a lubricating system requiring a minimum of attention.

Many other objects include the provision of a shock absorber which will be dust and mud proof, easy and economical to manufacture, simple in installation and repair, and many other features of novelty in construction and operation which will be or should become apparent after perusal of the following description and claims and after viewing the drawing in which:

Fig. 1 is a side elevation of one form of shock absorber constructed in accordance with my invention, the housing being broken away to show the interior mechanism.

Fig. 2 is a sectional view taken on the line 2—2 of Fig. 1.

Fig. 3 is a sectional view taken at right angles to the view of Fig. 2 on the line 3—3 of Fig. 1.

Fig. 4 is a detail view taken substantially on the line 4—4 of Fig. 3.

Fig. 5 is a diagrammatic illustration of the action of one form of spring for use on a vehicle in connection with which my shock absorber may be utilized; in this case a spring of the semi-elliptical type, and Figs. 6 and 7 are diagrammatic views of one manner in which my shock absorber may be constructed to operate; Fig. 6 showing the preferred action on movements of the vehicle spring toward neutral position and Fig. 7 showing the preferred action on movements from its neutral position.

Referring to the drawing and particularly to Figs. 1 to 4 inclusive, a vertical arm 2 forming one of the operating levers of the shock absorber illustrated is adapted to be pivotally connected to either of two relatively movable portions of a vehicle, such as to the axle, and this arm or lever 2 is also pivotally connected by a pivot pin 3 and other mechanisms to be hereinafter described to a normally horizontal lever arm 4 which is pivoted on a pin 5 adapted to be secured through a lock washer and nut 6 and 7, respectively, to another of said relatively movable portions of the vehicle, for instance, as in this case, to the frame 8 of the vehicle.

The shock absorber is spaced from the vehicle frame by means of any suitable spacing block 9 which abuts between the frame 8 and a reenforcing block 11, between which and what I shall term a back friction plate 12, one portion 13 of the housing of the shock absorber is securely clamped. Bolts 14, having their shanks bent at right angles, may secure both the back friction plate 12, the housing 13 and the reenforcing plate 11 together and be secured to an anchor plate 15 abutting at one end against the back of the housing 13 and at one face against the under side of the frame 8 of the vehicle by means of lock washer and nut 16 and 17 respectively. Any other means for securing the shock absorber and the part of the vehicle to which it is to be attached together, may be utilized as will be apparent. The nut and bolt hold the anchor plate 15 tightly against the bottom of the vehicle frame and prevent rotation of the device around the center pin 5.

Two friction discs 18 are engaged with the lever arm 4 one on each side thereof, and the rear plate is adapted to be frictionally engaged under certain conditions with the friction plate 12, while the front friction plate 18 is arranged for frictional engagement under certain conditions with a friction plate 19. The friction plate 19 has a circular groove 21 cut in one face thereof adjacent its periphery within which two or more steel balls or rollers 22 are adapted to roll, while a locking plate 26 is provided with projections 27 in the faces of which a double taper is cut to provide a groove 28 for reception of one of the balls 22. A bushing 24 is provided in the pivot opening of the lever arm 4 in order that the latter may have a greater bearing surface for oscillatory movement on the pin 5 without wobbling and is preferably of such width that it in turn forms a bearing surface for the friction plates 18 during their rotational or oscillatory movements, while the friction plate 19 is directly mounted on the pin 5 for oscillatory movement thereabout.

The friction plate 19 is provided with a forked extension 29 at one side thereof, as shown in Figs. 1 and 2, for the reception of a pin 30 of less diameter than the distance between the prongs of the fork, the pin 30 being rigidly attached at 31 to an adjusting arm 32 also mounted on the pin 5. The locking plate 26 is also provided with a forked extension 33 between the prongs of which a pin 34 closely fits. This pin is secured, as at 35, to a bell crank lever 36 pivotally connected to the adjusting plate 32 by means of a pivot screw 37. The bell crank lever 36 is provided at its upper end with a cam follower pin 38 adapted to contact with a cam surface, generally indicated at 39, formed on the perimeter or edge of the circular section of the lever arm 4. The cam 39 is preferably provided with four risers, 40, 40a, 40b and 40c, providing five steps for a purpose which will hereinafter more clearly appear. The pin 38 is kept in contact with this cam surface through the medium of a spring 41 suitably connected between the bell crank lever 36 and the adjusting plate 32.

The rear casing 13 is slotted for a distance corresponding to the maximum distance of angular movement of the lever arm 4 about the pivot 5 and to close the slot to prevent the entry of dust and mud, a slide member 42 preferably of spring steel is slotted to receive the arm 4 and fixed thereto so that upon movement of the arm the slide member will move with it and retain the slot in the casing closed at all times. The forward part of the casing, indicated at 43, is of an interior diameter equal to the outside diameter of the casing member 13 in order that the member 13 may be telescopically received within the member 43 and is held in place between a nut 44 and a lock bushing nut 45, forming a bearing surface for the locking plate 26 and adjusting arm 32. The casing member 43 is prevented from turning during the tightening of nut 44 or of nut 45 by means of a slot adapted to receive and be positioned over a screw 46 which passes through a slot formed circumferentially of the rear housing member 13 for adjustment therealong, in order to correspondingly adjust the forked end 47 of the adjusting plate 32 through which the screw passes. A nut 48 is adapted to secure the arm 32 in adjusted position.

The connection between the arm 2 and the arm 4 provides a novel bearing combining the feature of automatically taking up wear with the flexibility of a ball joint with a hollow interior which may contain a lubricant providing extreme usage with a minimum of lubrication or other attention. A cup member 49 of substantially the shape shown in Figs. 1 and 2, has its interior surface, indicated at 51, struck on a radius, or in other words, curved to provide a bearing surface or seat for the reception of a second cup like member 52 having an exterior surface correspondingly curved to the surface 51 in order that the member 52 may rotate or oscillate about the axis of pin 3 or the longitudinal axis of arm 2. The cup 51 is, of course, preferably secured to the arm 4 and the cup member 52 is secured to the arm 2, while the pivot pin passes through both and extends beyond the arm 2 in order that a spring 53 may be interposed between a cotter key 54 in the pin and the outer face of the arm 2 to urge the two cupped members together and to retain them in tight telescoping relation regardless of the wear. Grease or packing soaked with grease or other lubricant may be placed within the cup 52, as indicated at 54.

In operation, with the pin 5 securing the shock absorber to the vehicle frame and the arm 2 secured to the vehicle axle, when the end of arm 4 is moved upwardly from the neutral position or position of rest which it assumes when the vehicle is still or moving along a level surface (neutral position shown in the drawing), pin 38 rides along the cam surface between risers 40a and 40b until it reaches the riser 40b. During this movement no frictional resistance is encountered, but when the cam has moved in a counter-clockwise direction sufficiently to permit pin 38 to drop down the riser 40b under the influence of spring 41, the lever 36 is swung in a counter-clockwise direction, thereby moving locking plate 26 in the same direction causing balls 22 to roll up the inclines to the positions indicated in dotted lines at 22a in Fig. 1. This produces a slight wedging action between the friction plates 19 and 18 and arm 4 sufficiently to cause the arm 4 on further movement upward to slightly rotate the friction plate 19 in a counter-clockwise direction until the clearance between one prong of the forked projection 29 and the pin 30 has been taken up, but during this movement of the plate 19, which is in the same direction as the former movement of the locking plate 26, the balls 22 will be rolled back down the incline to or substantially to the bottom of the groove provided by the juncture of the inclines on each projection. This will release any pressure on the plates 19 and 18 and consequently during further movement of the arm 4 upwardly and for the angular distance determined by the distance between the risers 40b and 40c, there will be no frictional resistance offered to the movement of the arm 4. However, when the arm 4 has moved upwardly toward its upper limit and to the position where the pin 38 drops down the riser 40c, the lever 36 will again be moved slightly in a counter-clockwise direction, moving locking plate 26 also in a counter-clockwise direction and relatively to friction plate 19 which is fixed in position by pin 30, causing balls 22 to again ride up the inclined surfaces in the direction of their positions illustrated at 22a. This imposes frictional resistance through the plates 19 and 18 against the arm 4, retarding its further upward movement and, depending upon the movement of the lever 36, under the influence of the cam surface which may be gradually tapered down, the locking plate 26 may be rotated still further in a counter-clockwise direction gradually increasing the pressure against the friction plates 19 and 18 to increasingly retard further movement of the arm. The action that has just been described is diagrammatically illustrated in the upper half of Fig. 7.

The action of the device on movement from the position of extreme compression, which has just been described, toward the neutral position will now be set forth. Assuming that the pin 38 is resting in the dotted line position 38a with the vehicle spring coming back on its rebound movement or from its position of extreme compression, the arm 4 moving in a clockwise direction will cause the pin 38a to move along the cam surface from its position indicated at 38a toward the riser 40c, during which movement the plate 26 will remain stationary, but owing to the fact that the balls 22 have assumed positions somewhere about the positions indicated at 22a, pressure will be exerted against plates 19 and 18 sufficiently to cause the arm 4 through its frictional engagement with these plates to rotate the plate 19 in a clockwise direction until the lower prong of the forked projection 29 contacts with the bottom side of pin 30. This clockwise movement of the plate 19 will tend to roll the balls 22 further up the inclines in their direction of movement toward the positions indicated at 22a, thereby instantaneously increasing the frictional interengagement of the several friction plates and consequently imposing a great frictional resistance to movement of the arm 4 downwardly or in a clockwise direction. As soon as the pin 38 strikes the riser 40c and is raised, it swings the lever 36 in a clockwise direction thereby rotating the locking plate 26 in the same direction for the angular subtended distance of rise of the riser. This movement will roll the balls 22 down the inclines toward the neutral position to a position which will be assumed to be indicated at 22a. This will lessen the frictional interengagement of the several friction plates, but the frictional resistance depending on the design of the cam surfaces may remain the same until the pin 38 strikes the riser 40b, when it will again be raised and cause the locking plate 26 to be rotated another increment in a clockwise direction, rolling the balls 22 to their neutral or central position. This sequence of movements is illustrated in the upper half of Fig. 6.

On movements toward extreme expansion of the vehicle spring, the lever arm 4 first rotates from the neutral position in a clockwise direction which carries the locking plate 26 likewise in a clockwise direction rolling the balls 22 up the inclines to some position such as that indicated at 22b until the pin 38 strikes the riser 40a, whereupon the plate 19, which has since the previously described movements, assumed its normal position, now moves a slight distance until the clearance between the lowermost prong of the forked projection 29 has contacted with the pin 30, which movement of the plate 19 returns the balls 22 to their neutral position in the bottoms of the grooves formed by the juncture of the inclined surfaces. The balls remain in this neutral position during the time the pin 38 is traveling from the riser 40a to the riser 40, but upon engagement of the pin with the riser 40, the plate 19 being held by the pin 30, the locking plate 26 will be rotated in a clockwise direction to return the balls to their position at 22b, imposing frictional resistance to further movement of the lever 4 downwardly or in a clockwise direction and thus opposing further expansion of the spring. This action serves the purpose of the usual rebound strap.

Upon return movement of the spring and the arm 4 to the neutral position from the position of extreme expansion of the spring, assuming that the pin 38 is at the position indicated in dotted lines at 38b, initial counter-clockwise movement of the arm 4 will serve to rotate the plate 19 in a counter-clockwise direction, also tending to move the balls 22 further up the inclines from their positions indicated at 22b until further movement of the plate 19 is limited by abutment of the upper prong of the projection 19 against the top of pin 30. Now as soon as the pin 38 drops down the riser 40, the locking plate 26 is given a counter-clockwise movement which rolls the balls 22 back down the inclines to some position such as that indicated at 22b, where they remain and impose a certain frictional retarding effect on further counter-clockwise movement of the arm 4 until the riser 40a has been reached when the frictional resistance will be removed and the parts restored to their normal position.

No attempt has been made to illustrate anything but the simplest form of cams and cam actions, although it will be apparent that with various designs of cams, various actions may be obtained, and as those skilled in the art may readily understand the invention without a description of every modification of cam action, I have not deemed it necessary to show or describe other forms or types of the invention.

In order to provide for any adjustment, such as might be required due to a variation in the distance between the vehicle axle and the frame, the rotation of adjusting arm 32 will place it in such a position as to hold plate 26 in that position which will allow the steel balls 22 to be at the bottom of the groove formed by the tapers on the wedged projections 27 when the whole device is in neutral position. This adjustment is obtained by tightening and loosening the screw 46 and nut 48 with the consequent slight rotation of the outer casing 43. Any wear between the frictional plates may be compensated by adjusting nut 45 until the balls 22 are held rigidly between the projections 27 and the friction plate 19 when the balls are at the bottom of the groove formed by the tapers of the projections 27. Tightening of nut 44 will lock the parts in adjusted position.

From the foregoing it will be apparent that I have provided a novel shock absorber adaptable to many different types of construction wherein it may be desirable to utilize a shock absorber and capable of modification in many respects to suit varying conditions, circumstances and requirements. Since, therefore, my invention is of broader application and susceptible of various modifications other than illustrated and described herein, I do not desire to be limited to the specific form shown and described, but only by the spirit of the invention and the scope of the appended claims.

I claim:

1. In combination, two relatively movable members, resilient means connected with said members, means inoperative during certain initial relative movements of said members in either direction from neutral and operative after said certain initial movements thereof for gradually retarding further relative movements of said members in their then direction of relative movement and means operative during certain other relative movements of said members in either direction toward neutral for applying an initial maximum retardation to such movements and thereafter gradually reducing said retardation from said initial maximum to minimum values, the retarding effects of the first and second said means being unequal.

2. In combination, a spring, two vehicular members connected to and spaced by said spring for relative movements in a plurality of directions toward and from a position of equilibrium or rest, normally inoperative friction devices including rotatable elements having connection with said members and means operative during predetermined movements of said spring away from and toward said position for frictionally interengaging said devices, to retard movements of said members corresponding to movements of said spring.

3. A device of the character described comprising, an arm pivoted at one end and adapted to be connected to one of a pair of relatively movable members at its other end, a cam secured to said arm, a relatively stationary member, a cam follower pivoted to said relatively stationary member and engaged with said cam, and means connected with said cam follower and operable thereby for imposing frictional resistance to predetermined movements of said arm.

4. A device of the character described comprising, a lever arm adapted to be pivotally connected at one end to one of two relatively movable members and to be connected by its other end to the other of said relatively movably members, a cam surface on the first said end of said lever arm, a relatively stationary member, an oscillatable element, a second lever pivoted intermediate its ends to said stationary member, a cam follower on one end of said second lever and riding on said cam surface, a connection between the other end of said second lever and said element for moving the latter in accordance with certain movements of said follower under influence of said cam surface, and means operable upon certain movements of said element for frictionally resisting movements of said lever arm.

5. A device of the character described comprising, a lever arm adapted to be pivotally connected at one end to one of two relatively movable members and to be connected by its other end to the other of said relatively movable members, a relatively stationary member, an oscillatable element, a second lever pivoted intermediate its ends to said stationary member and having connection with said element for moving the same, means connecting said second and first said levers for moving the second upon predetermined movements of the first, and means operated by predetermined movements of said element for imposing frictional resistance to certain movements of said lever arm.

6. A device of the character described comprising, a lever arm adapted to be pivotally connected at one end to one of two relatively movable members and to be connected by its other end to the other of said relatively movable members, a relatively stationary member, an oscillatable element, a second lever pivoted intermediate its ends to said stationary member and having connection with said element for moving the same, means connecting said second and first said levers for moving the second upon predetermined movements of the first, and means including a friction plate engageable with said lever arm upon predetermined movements of said element for imposing frictional resistance to certain movements of said lever arm.

7. A device of the character described comprising, a lever arm adapted to be pivotally connected at one end to one of two relatively movable members and to be connected by its other end to the other of said relatively movable members, a relatively stationary member, an oscillatable element, a second lever pivoted intermediate its ends to said stationary member and having connection with said element for moving the same, means connecting said second and first said levers for moving the second upon predetermined movements of the first, a plate adapted to frictionally engage said lever arm, and means interposed between said oscillatable element and said plate for urging said plate into frictional engagement with said lever arm upon predetermined movements of said element.

8. A device of the character described comprising an arm pivoted at one end and adapted to be connected to one of a pair of relatively movable disc members at said end, a cam secured to said arm, a relatively stationary member, a cam follower pivoted to said relatively stationary member and engaged with said cam and means connected with said cam follower and operable thereby for causing lateral movements of said disc members to impose frictional resistance to predetermined movements of said arm.

In witness of the foregoing I affix my signature.

EARL H. SMITH.